March 3, 1970   W. E. RIEMAN ET AL   3,497,931
CAPACITOR WITH ATTACHED LEAD AND METHOD OF FORMING SAME
Filed May 24, 1966
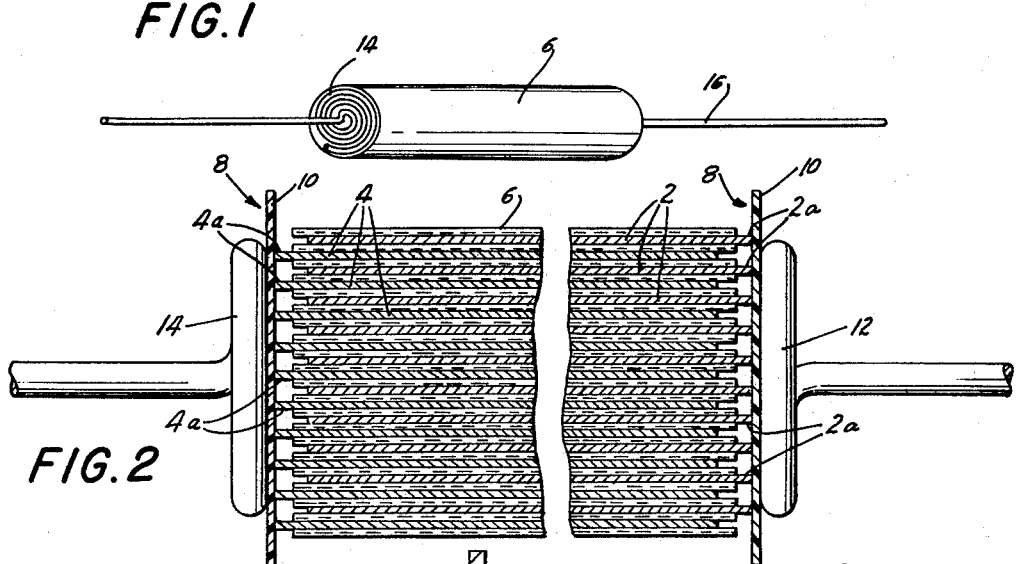
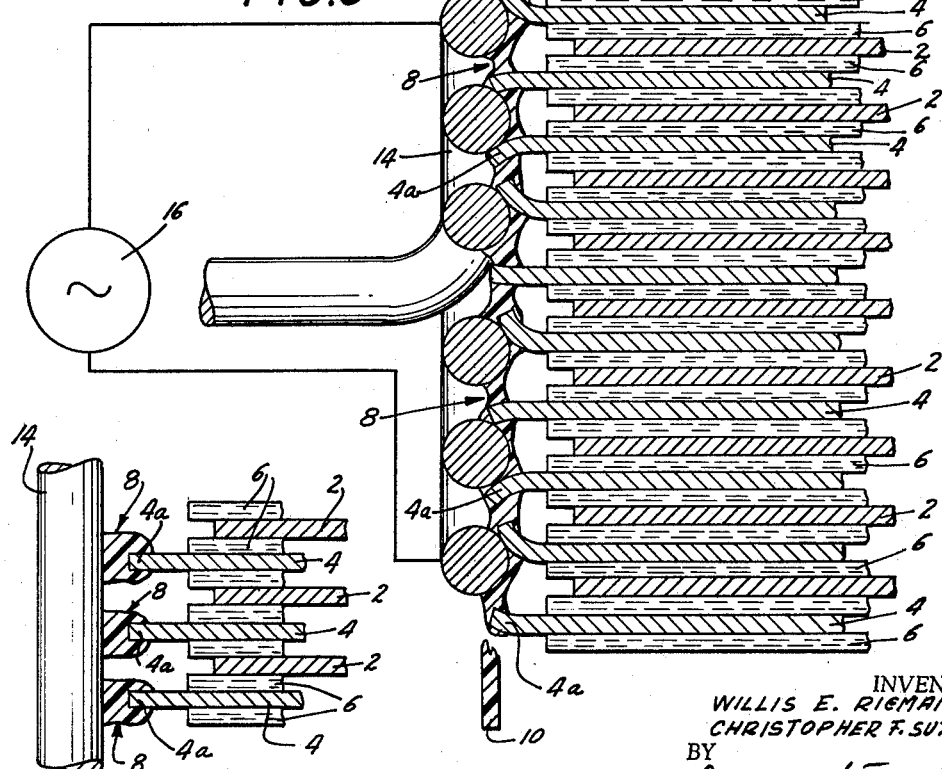
INVENTOR.
WILLIS E. RIEMAN
CHRISTOPHER F. SUTPHIN
BY
ATTORNEY

United States Patent Office 3,497,931
Patented Mar. 3, 1970

3,497,931
CAPACITOR WITH ATTACHED LEAD AND METHOD OF FORMING SAME
Willis E. Rieman, Florence, and Christopher Sutphin, Darlington, S.C., assignors to General Instrument Corporation, Newark, N.J., a corporation of New Jersey
Filed May 24, 1966, Ser. No. 552,521
Int. Cl. H01g 13/00
U.S. Cl. 29—25.42
12 Claims

ABSTRACT OF THE DISCLOSURE

A lead is physically and electrically secured to a portion of an electrode of a capacitor which extends out beyond the dielectric layer between the electrodes by means of a thermoplastic body, the lead being forced through that body and into contact with the electrode while the body is softened, the body thereafter hardening around the lead and holding it in position.

---

The present invention relates to a solderless method of attaching leads to condenser electrodes and to the product produced thereby. It is particularly, but not necessarily exclusively, applicable in connection with rolled capacitors.

A capacitor typically comprises a pair of electrodes, usually in the form of conductive metal layers which overlie one another and are separated by a layer of dielectric material. In one common form of capacitor, usually termed a "wound" or "rolled" capacitor, all of the layers are flexible and the electrode layers with the dielectric layer sandwiched therebetween are tightly rolled up into a helically coiled package, thereby providing for maximum electrode area while taking up a minimal amount of space.

Electrical connections must, of course, be made to the condenser electrodes. There are two prime considerations involved in the making of such electrical connections: the connections must be electrically good and mechanically strong. An operationally subsidiary but practically predominant consideration is the cost of manufacture. Important factors in the cost of manufacture are the time consumed, the materials employed, the susceptibility of the manufacturing process to automatic manipulation, and the minimization of the number of rejects.

The connecting of leads to the electrodes of capacitors, and particularly to the electrodes of wound or rolled capacitors, has presented a problem, particularly in the course of large scale manufacture. It is preferable from the point of view of manufacturing procedure to be able to roll the capacitor and then apply the leads thereto, but the achievement of an electrically sound and mechanically strong connection between the lead and the electrode has in the main eluded the art. When the electrodes are formed of thin copper sheets solder-bonding of the electrodes to those sheets has not been overly difficult, but the electrode sheets themselves were of such limited mechanical strength as to permit the leads to be torn from the assembled capacitor when only moderate forces were applied. The art then turned to the use of electrodes formed of sheets of aluminum. These had adequate mechanical strength, but it was relatively difficult and time consuming to solder-bond the electrodes to those sheets, and the number of rejects in quantity production was excessively high.

It was then proposed that if the dielectric layer itself were formed of a thermoplastic material, and if that layer were substantially coextensive with the electrode portion to which the lead was to be attached, the thermoplastic material of that dielectric could be utilized to first soften and then harden about the lead as the lead was pressed against the electrode portion, thereby to retain the lead firmly in good electrical connection with the electrode. From a manufacturing point of view this approach has proved advantageous, but it has had a significant electrical drawback—the thermoplastic materials which function to hold the leads against the electrode are not ideal dielectrics insofar as the electrical characteristics of the capacitor are concerned. Indeed, there are many applications where such thermoplastic dielectrics are undesirable, and for such applications condensers having other types of dielectric, such as impregnated paper, are employed; with them the old problems of lead attachment still obtain.

It is the prime object of the present invention to devise a method for the attaching of leads to condenser electrodes, preferably without having to use solder, which permits complete freedom in the choice of condenser dielectric, and which may be used in condensers having non-thermoplastic dielectrics as well as with condensers having thermoplastic dielectrics. It is a further prime object of the present invention to attach the leads to the condenser electrodes in such a fashion as to be readily and inexpensively accomplished in quantity production, while at the same time producing capacitors the leads of which are connected to the electrodes with an exceptionally high degree of strength.

To those ends the capacitor electrode to which a lead is to be applied extends out from the capacitor assembly beyond the dielectric layer, which dielectric layer, as has been mentioned, can be of whatever type is best adapted to the achievement of the desired electrical characteristics. A body of thermoplastic material independent of the dielectric layer is positioned on the outwardly extending electrode portion, and preferably over the outwardly extending edge thereof. Two methods of accomplishing this are here disclosed. In one a self-sustaining sheet or film of thermoplastic material is placed against the outwardly extending edge of the electrode portion; in the other bodies of thermoplastic material are coated onto the outwardly extending electrode portions. The lead to be connected is then positioned operatively against the electrode portion. Heat is applied to soften the thermoplastic body, and the lead is forced through the thermoplastic material so as to engage, and preferably become imbedded in, the outwardly extended electrode portion. While the lead is held in that latter position the thermoplastic material is permitted to cool and harden, and it then reliably holds the lead in its position engaging and electrically connected to the electrode portion. At the same time the hardened thermoplastic material preferably substantially seals off that area of the exterior of the capacitor assembly where it was initially applied, thus producing a protective effect.

To the accomplishment of the above, and to such other objects as may hereinafter appear, the present invention relates to the attachment of a lead to a capacitor electrode and to the capacitor assembly produced thereby, as defined in the appended claims, taken together with the accompanying drawings, in which:

FIG. 1 is an idealized three-quarter perspective view of a wound capacitor made in accordance with the present invention;

FIG. 2 is a cross sectional view showing the capacitor leads and thermoplastic bodies in the position which they assume at the beginning of the lead-attaching process according to one disclosed embodiment;

FIG. 3 is a fragmentary cross sectional view on an enlarged scale showing the relationship of parts after the lead attachment process has been carried out; and FIG. 4 is a fragmentary cross sectional view similar to FIG. 2 but showing an alternative embodiment.

The instant invention is particularly well adapted for use in connection with the manufacture of wound or rolled capacitors, and it therefore is here illustrated in that connection. Such a rolled capacitor, before lead attachment, typically comprises a pair of conductive metal layers 2 and 4 typically formed of thin sheets of aluminum. It will be understood that other materials, such as tin foil, copper foil, and the like, could be employed, and that the electrode layers 2 and 4 may either be self-sustaining or in the form of very thin layers applied to a self-sustaining backing. Interposed between the electrodes 2 and 4 is a dielectric layer 6. Many materials are known which function well in this regard. Some, like Mylar and polystyrene, are thermoplastic, but others, like paper, are not thermoplastic. The significant fact about the instant invention is that the composition of the dieletric layer 6 plays no part in the lead attachment process subsequently to be described.

As indicated in FIG. 2, the electrodes 2 and 4 are arranged relative to the dielectric layer 6 so that a portion 2a of the electrode 2 extends out laterally to one side of the dielectric layer 6, while portion 4a of the electrode 4 extends out laterally to the other side of the dielectric layer 6, with one side of the subassembly having only portion 2a extending out therefrom while the other side of the subassembly has only portion 4a extending out therefrom. The subassembly is then tightly rolled or wound into a helical coil, assuming the condition shown in FIGS. 1 and 2, one side of the thus-defined subassembly having a plurality of convolutions defined by the portion 2a extending out therefrom while the other side of the thus defined subassembly has a plurality of convolutions defined by the portion 4a extending out therefrom. It is significantly that the formation of this rolled subassembly is easily and conveniently accomplished on automatic machinery, and that the operations involved are not complicated by any lead-attachment problems.

Next the laterally extending electrode portions 2a and 4a have a body of thermoplastic material generally designated 8 applied thereto. In the form specifically disclosed in FIGS. 2 and 3 that thermoplastic body 8 is defined by a thin self-sustaining sheet 10 of appropriate material such as Mylar, polystyrene, polyethylene, and the like. The sheet 10 may be so thin as to be essentially a film; thicknesses of .00025 inch have proven to be entirely satisfactory.

Next the leads 12 and 14 are applied operatively against the electrode portions 2a and 4a respectively. As shown in FIG. 2 the leads 12 and 14 are of pigtail form, with the sheets 10 being sandwiched between the coiled portions of the leads 12 and 14 and the outwardly extending edges of the electrode portions 2a and 4a respectively.

Next heat is applied to soften the thermoplastic bodies 8, and the leads 12 and 14 are urged axially inwardly, pushing their way through the softened sheets 10 into firm physical and electrical engagement with the electrode portions 2a and 4a resepectively. Usually the combination of heat and pressure, coupled with the thinness of the electrode sheets 2 and 4, cause the leads 12 and 14 to deform the electrode portions 2a and 4a respectively so as, in effect, to become at least partially imbedded in those electrode portions.

While the heat which softens the thermoplastic bodies 8 may be applied in a wide variety of manners, one particularly effective mode of heat protection is, as is illustrated in FIG. 3, to connect that portion of the leads 12 and 14 which is operatively positioned against the electrode portion 2a or 4a in circuit with a source 16 of electrical current. The passage of electrical current through the lead 12 or 14 causes it to become heated, thereby applying heat directly to those portions of the thermoelectric bodies where softening is most desired, that is to say, those portions of said bodies 8 where the lead 12 or 14 is to push its way through.

As is typically illustrated in FIG. 3, the result of the thus-described action is to cause the thermoplastic bodies 8 to melt, thus permitting the lead 12 or 14 to be moved into engagement and electrical connection with the corresponding electrode portions 2a or 4a. At the same time parts of the thermoplastic bodies 8 melt into the spaces between adjacent convolutions of the electrode portions 2a and 4a.

Thereafter, while the leads 12 and 14 are held in position, the heating effect is terminated, as by disconnecting the electrical source 16 from the leads 12 and 14. The thermoplastic material cools and solidifies, bonding itself firmly both to the leads 12 and 14 and to the electrode portions 2a and 4a. The cooling and solidification of the thermoplastic material is generally accompanied by a shrinking, thus acting to pull the leads 12 and 14 into even firmer engagement with the electrode portions 2a and 4a and enhancing the efficacy of the electrical connection produced. The hardened thermoplastic material spans the spaces between the adjacent convolutions of the electrode portions 2a and 4a and effectively seals the ends of the capacitor assembly, preventing the entry through those ends of moisture, dust or the like which might have an adverse effect on the electrical characteristics of the capacitor. The bonding effect of the hardened thermoplastic material is such that the leads 12 and 14 are held firmly and reliably against, and in excellent electrical connection with, the electrode portions 2a and 4a respectivey.

After these operations have been performed the capacitor may be used as such, or it may be encapsulated, encased or otherwise mounted, all as is conventional in the field.

Instead of using individual sheets or films 10 to provide the thermoplastic material 8, that material may be coated onto the outwardly extending electrode portions 2a and 4a, as is illustrated in FIG. 4, or the thermoplastic material 8 may be initially coated onto the leads 12 and 14 so as to extend therefrom in a direction toward the outwardly extending electrode portions 2a and 4a, this being a reversal of that which is shown in FIG. 4. The coating of FIG. 4 may be done either before or after the individual electrode sheets 2 and 4 are assembled with the dielectric sheet 6. It is preferred, as is illustrated, that the coating be such that some of the thermoplastic material covers the outwardly extending edge of the electrode portion, and it is further preferred that the thickness of the coating be sufficient, when a wound capacitor is involved, so that the softened thermoplastic material will flow from one electrode section convolution to an adjacent convolution and thus seal the capacitor end in the course of the lead attachment operation.

It will be apparent from the above that in accordance with the present invention a capacitor has been produced in which leads are attached to the capacitor electrodes without having to use solder, and by means of simple manipulative steps easily accomplished in quantity production. The nature of the lead attachment procedure imposes no restraints on the choice of condenser dielectric. The resultant structure is one in which the leads are very strongly physically secured to the remainder of the capacitor assembly and make excellent electrical connection with their respective condenser electrodes.

While but a limited number of embodiments of the present invention have been here specifically disclosed, it will be apparent that many variations may be made therein, all within the scope of the instant invention as defined in the following claims.

We claim:

1. The method of attaching a lead to an electrode of a capacitor which comprises a pair of electrodes separated by a dielectric layer, one of said electrodes having a portion extending out beyond said dielectric layer over a given area, said method comprising engaging a body of thermoplastic material independent of said dielectric layer with said outwardly extending portion of said electrode over at least a major portion of said given area, operatively engaging a lead with said thermoplastic body, softening said thermoplastic body, forcing a given portion of said lead into said softened thermoplastic body and against and into electrical conductive engagement with said electrode portion, and causing said thermoplastic body to harden.

2. The method of claim 1, in which said thermoplastic body comprises a self-sustaining layer of material placed against the outwardly extending edge of said electrode.

3. The method of claim 2, in which said thermoplastic body, before being softened, is sandwiched between said lead and said outwardly extending electrode portion.

4. The method of claim 1, in which said thermoplastic body comprises a layer of material coated onto one of said outwardly extending electrode portions and said lead.

5. The method of claim 4, which said thermoplastic body, before being softened, is sandwiched between said lead and said outwardly extending electrode portion.

6. The method of claim 1, in which said thermoplastic body comprises a layer of material coated onto said outwardly extending electrode portion and covering at least a part of the outwardly extending edge thereof.

7. The method of claim 6, in which said thermoplastic body, before being softened, is sandwiched between said lead and said outwardly extending electrode portion.

8. The method of claim 1, in which said thermoplastic body, before being softened, is sandwiched between said lead and said outwardly extending electrode portion.

9. The method of claim 1, in which said electrode portion comprises radially spaced sections, said thermoplastic body being initially engaged with said sections and being caused to span the spaces between said sections after being softened and then caused to harden.

10. The method of claim 2, in which said electrode portion comprises radially spaced sections, said thermoplastic body being initially engaged with said sections and being caused to span the spaces between said sections after being softened and then caused to harden.

11. The method of claim 4, in which said electrode portion comprises radially spaced sections, said thermoplastic body being initially engaged with said sections and being caused to span the spaces between said sections after being softened and then caused to harden.

12. The method of claim 6, in which said electrode portion comprises radially spaced sections, said thermoplastic body being initially engaged with said sections and being caused to span the spaces between said sections after being softened and then caused to harden.

References Cited

UNITED STATES PATENTS

| 3,040,415 | 6/1962 | Rayburn | 29—25.42 |
| 3,163,917 | 1/1965 | Bilsing et al. | 29—25.42 |
| 3,237,273 | 3/1966 | Gunter et al. | 29—25.42 |
| 3,237,274 | 3/1966 | Kalina | 29—25.42 |
| 3,244,953 | 4/1966 | Walsh et al. | 29—25.42 XR |

FOREIGN PATENTS

| 840,059 | 7/1960 | Great Britain. |

JOHN F. CAMPBELL, Primary Examiner

R. B. LAZARUS, Assistant Examiner

UNITED STATES PATENT OFFICE
CERTIFICATE OF CORRECTION

Patent No. 3,497,931                          March 3, 1970

Willis E. Rieman et al.

It is certified that error appears in the above identified patent and that said Letters Patent are hereby corrected as shown below:

In the heading to the printed specification, line 6, "a corporation of New Jersey" should read -- a corporation of Delaware --.

Signed and sealed this 15th day of December 1970.

(SEAL)

Attest:

Edward M. Fletcher, Jr.

Attesting Officer

WILLIAM E. SCHUYLER, JR.
Commissioner of Patents